United States Patent

Watts

[11] Patent Number: 5,914,810
[45] Date of Patent: Jun. 22, 1999

[54] STEREOSCOPIC IMAGING ARRANGEMENT AND VIEWING ARRANGEMENT

[76] Inventor: Jonathan Robert Watts, c/o Liquid Vision Ltd, The Old Workshops, Farringdon, Exeter, Devon, United Kingdom, EX5 2JD

[21] Appl. No.: 08/649,661
[22] PCT Filed: Nov. 23, 1994
[86] PCT No.: PCT/GB94/02572
  § 371 Date: Aug. 6, 1996
  § 102(e) Date: Aug. 6, 1996
[87] PCT Pub. No.: WO95/14952
  PCT Pub. Date: Jun. 1, 1995

[30] Foreign Application Priority Data

Nov. 23, 1993 [GB] United Kingdom ................. 9324047.1

[51] Int. Cl.$^6$ ............................. G02B 27/22; A61B 1/04; H04N 13/02; H04N 9/47
[52] U.S. Cl. .......................... 359/464; 359/466; 359/462; 348/45; 348/55; 348/56; 600/111
[58] Field of Search ..................................... 359/462, 464, 359/465, 466, 475, 482, 376, 377, 378; 348/45, 49, 53, 56, 59; 600/111, 112

[56] References Cited

U.S. PATENT DOCUMENTS

| 5,002,387 | 3/1991 | Balget et al. | 359/464 |
| 5,181,028 | 1/1993 | Sharpe et al. | 340/974 |
| 5,222,477 | 6/1993 | Lia | 348/45 |
| 5,410,345 | 4/1995 | Eichenlamb | 359/475 |
| 5,471,237 | 11/1995 | Shipp . | |
| 5,546,120 | 8/1996 | Miller et al. | 348/59 |
| 5,588,948 | 12/1996 | Takahashi et al. | 348/45 |

FOREIGN PATENT DOCUMENTS

| 0332959 | 3/1989 | European Pat. Off. . |
| 60241018 | 5/1984 | Japan . |
| 2244624 | 12/1991 | United Kingdom . |

OTHER PUBLICATIONS

Patent Abstracts of Japan, vol. 10, No. 110 (P–450) (2167) Apr. 24, 1986 & JP,A, 60 241 018 (Olympus Kogaku Kogyo K.K.) Nov. 29, 1985.

*Primary Examiner*—Cassandra C. Spyrou
*Assistant Examiner*—Audrey Chang
*Attorney, Agent, or Firm*—Ladas & Parry

[57] ABSTRACT

A stereoscopic imaging arrangement comprises a) an optical device (1) having an objective (2) and further lens means (3) located remotely from but in the optical path of the objective and b) a stereoscopic imaging device (4) arranged to receive light from said further lens means and form an image on a photosensitive image plane (7), the stereoscopic imaging device having shutter means (5) arranged to selectively occlude light exiting from left and right regions of said further lens means to form right and left images on said image plane and having means for combining said right and left images to form a stereoscopic representation of the field of view of said objective. The image may be displayed on a monitor (9) and viewed stereoscopically with switching spectacles (10).

13 Claims, 4 Drawing Sheets

STEREOSCOPIC IMAGING ARRANGEMENT AND VIEWING ARRANGEMENT

BACKGROUND TO INVENTION

1. Field of the Invention

The present invention relates to a stereoscopic imaging arrangement and to a stereoscopic viewing arrangement for use with such an imaging arrangement.

2. Description of Related Art

Numerous stereoscopic imaging and/or viewing arrangements are known. For example GB 606,065 discloses an arrangement for viewing scale models in stereoscopic fashion wherein a viewing tube containing an objective lens and a further lens is combined with two mutually orthogonal mirrors which divert light exiting from left and right regions of the further lens to respective eyepieces of a binocular viewing arrangement. GB 606,065, which dates from 1948, also refers to an even earlier stereoscopic eyepiece, as described in GB 167,130, for microscopes. This stereoscopic eyepiece comprises two tubes for binocular viewing, a single objective, and reflecting prisms positioned so that rays of light passing through the right-hand aide of the objective are reflected to the left and then into one viewing tube and rays of light passing through the left-hand side of the objective are reflected to the right and then into the other viewing tube.

Also U.S. Pat. No. 2,639,653, which dates from 1949, discloses a camera arrangement for taking microphotographs comprising a microscope having a blocking diaphragm which is used to obscure the left half and then the right half of the objective lens of a microscope. The respective photographs taken in this manner can be viewed through a stereoscope to give a three-dimensional impression of the object. It is stated at Col. 3 lines 15 to 18 that the blocking diaphragm may be located before or after the objective lens and within its focal point.

More recently stereoscopic endoscopes have been developed. In view or the size constraints on an endoscope, it is highly desirable to minimise the transverse dimensions of the optical system and for this reason many designs utilize a single objective and a beam splitting arrangement in its optical path which separates the light forming the left and right images.

For example U.S. Pat. No. 5,222,477 discloses a stereoscopic endoscope arrangement wherein an aperture plate is located adjacent the objective lens of a video camera assembly in the distal tip of the endoscope. Left and right apertures of the plate are opened alternately by a shutter which is coupled to a video switching arrangement. In this manner left and right images are detected in rapid succession and are alternately displayed on a monitor screen so that they can be viewed stereoscopically by means of a pair of spectacles in which the left and right eyepieces are occluded alternately in rapid succession in synchronism with the display. Such display systems are commercially available.

However the above shutter arrangement has the disadvantage that it cannot easily be retrofitted to an existing monocular endoscope. Furthermore the addition of shutter components to the tip portion of the endoscope tends to increase its bulk, which is undesirable.

GB-A-2,268,283 (which was published after the priority date of the present application) discloses an arrangement comprising a monocular endoscope having two mutually orthogonal reflecting surfaces disposed symmetrically at the exit pupil with their intersection vertical and intersecting the optical axis such that rays originating from the left hand region of the objective are separated from rays originating from the right hand region. The two sets of rays are focused onto respective television tubes and the resulting images are displayed by means of two orthogonal monitor screens which display cross-polarised images and have a partially reflecting surface disposed symmetrically between them. In this manner the images are combined and can be viewed stereoscopically by a user wearing polarising spectacles with cross-polarized lenses.

The provision of a beam splitting arrangement at the exit pupil of the endoscope in accordance with GB-A-2,268,283 avoids some of the above-noted problems of the arrangement of U.S. Pat. No. 5,222,477 but requires precise arrangement of the optical axis of the beam splitter with the optical axis of the endoscope and also requires that the rays exiting from the ocular of the endoscope are parallel. Furthermore the provision of a beam-splitting arrangement undesirably increases the number of reflecting surfaces and adds to the expense of the apparatus.

SUMMARY OF INVENTION

An object of the present invention is to alleviate at least some of the above disadvantages.

A further object of the invention is to reduce the number of optical components in a stereoscopic imaging arrangement.

A further object of the invention in a preferred embodiment is to provide a stereoscopic imaging arrangement which allows for a more versatile spatial filtering of the light from the field of view.

Accordingly the invention provides a stereoscopic imaging arrangement comprising a) an optical device having an objective and further lens means located remotely from but in the optical path of the objective and b) a stereoscopic imaging device arranged to receive light from said further lens means and form an image on a photosensitive image plane, the stereoscopic imaging device having shutter means arranged to selectively occlude light exiting from left and right regions of said further lens means to form right and left images on said image plane and having means for combining said right and left images to form a stereoscopic representation of the field of view of said objective.

The means for combining the right and left images may for example comprise a video processing circuit which generates a video signal representing the alternating left and right images. Such a video signal can be regarded as a stereoscopic representation in electronic form.

The invention also encompasses a stereoscopic viewing arrangement comprising such a stereoscopic imaging arrangement and a display means arranged to display a stereoscopic representation of said field of view.

Preferably said left and right regions overlap. This feature, which is not obtainable with the arrangement of GB-A-2,268,283, enables the light transmission to be increased at the expense of a reduction in the stereoscopic effect.

Preferably said shutter means comprises an array of more than two optical shutter elements distributed from left to right and means for controlling the light transmission of said optical shutter elements so as to vary the stereo base width between said right and left images.

Preferably said shutter means includes control means for varying the size of the unoccluded left and right regions of said further lens means to vary the width of field and/or the illumination at said image plane. Preferably said shutter means comprises a multisensitivity of shutter elements arranged to form vertical units of controllable width and/or height and separation.

The invention also provides a stereoscopic viewing arrangement which comprises a film projector arranged to project left and right images alternately in rapid succession and binocular viewing means controlled by a signal from the projector and arranged to convey the left images and right images selectively to the left and right eyes respectively or a user.

Further preferred features of the invention are claimed in the dependent claims.

BRIEF DESCRIPTION OF DRAWINGS

Preferred embodiments of the invention are described below by way of example only with reference to FIGS. 1 to 8 of the accompanying drawings wherein.

DESCRIPTION OF PREFERRED EMBODIMENT

Figure 1:
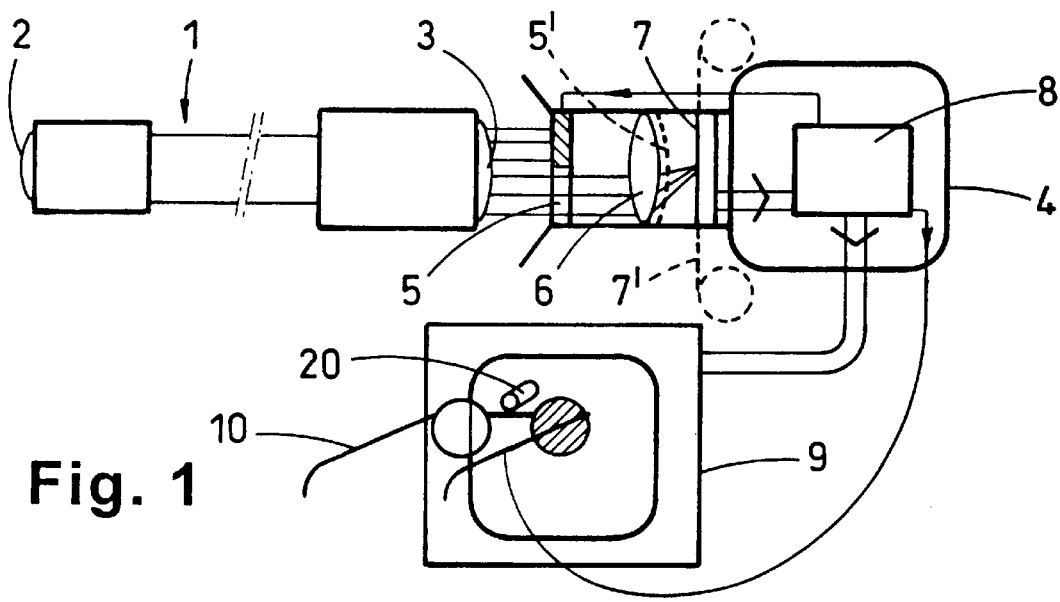
FIG. 1 is a diagrammatic representation of a stereoscopic viewing arrangement in accordance with the invention.

Referring to FIG. 1, a conventional monocular rigid endoscope 1 having an objective lens 2 at its distal tip and an ocular 3 at its proximal end is optically coupled to a video camera 4 (shown in plan view) which focuses light exiting from a further lens means, namely an ocular 3 onto the photosensitive image plane 7 of a conventional photosensitive detector (such as a CCD for example) by means of a focusing lens 6. It will be appreciated by those skilled in the art that in practice lens 6 will normally be a multi-element lens and that the exposure will normally be controlled by an iris (not shown). As described thus far the arrangement is conventional. Alternatively the camera 4 may be a cine camera, in which case the light from lens 6 is focused onto the photosensitive image plane 7' of the cine film.

In accordance with the invention a shutter 5 is provided which is arranged to alternately occlude the light exiting from the left and right regions of the ocular 3 preferably at a rapid rate such as 50 times per second (for video), under the control of a signal from video processing circuitry 8. The shutter 5 may be provided in front of lens 6 as shown, between different lens elements of a multi-element lens 6 (not illustrated) or may he located between the lens 6 and photosensitive image plane 7, for example. In particular the shutter may be a LCD shutter printed on a surface of lens 6, as illustrated at 5'. The rays blocked by shutter 5 are preferably parallel as shown but may alternatively converge or diverge. Particularly if the rays are converging, as is the case for variant 5', the shutter should preferably be located close to the lens.

Preferably a hood (not shown) is provided at the interface of camera 4 and endoscope 1 to prevent stray light entering the video camera, or the camera and endoscope are integral. The endoscope may be a laparoscope, a baroscope, a cystoscope or an arthroscope for example. The user may pull focus or zoom (assuming the lens has this facility) without affecting the stereoscopic imaging.

Video processing circuitry 8 generates a video signal representing the alternating left and right images originating from the left and right portions of the field of view of objective lens 2 and transmits this video signal to a monitor 9, which displays the left and right images alternately, each at 25 fields per second. Video processing circuitry 8 also generates a switching signal, synchronised with the switching of shutter 5, and this signal is transmitted via a flexible cable to a pair of spectacles 10 having liquid crystal shutters over the eyepieces which open alternately in response to this signal. Hence the left eyepiece is opened whenever the left image is displayed on monitor 9 and the right eyepiece is opened whenever the right image is displayed. Each eyepiece opens at rate of 25 times per second, so that a user wearing the spectacles perceives a stereoscopic image. The image quality can be improved by doubling the above rate of 25 fields/seconds with a corresponding doubling of the rate of switching of the spectacles.

In accordance with a preferred feature of the invention, the spectacles 10 are provide with means 20 for enabling their orientation and/or position in the horizontal plane (relative to the monitor) to be detected and a signal representative of this information is used to control the operation of shutter 5. Means 20 may for example comprise a coil arranged to transmit an electromagnetic signal which can be detected by a fixed sensor (not shown). Since position sensing arrangements are known per se, means 20 will not be described in further detail. The above mode of operation of shutter 5 will be described below with reference to FIG. 5.

Firstly however other modes of operation of shutter 5 will be described.

Figure 2A:
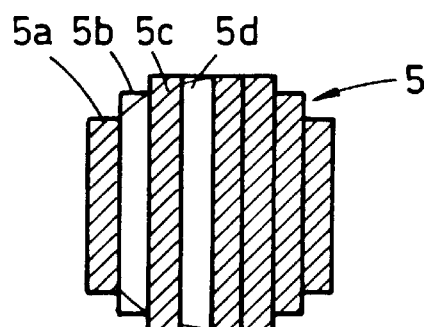
FIG. 2 is an illustration of the mode of operation of a shutter which can be used in the arrangement of FIG. 1.
Figure 2B:
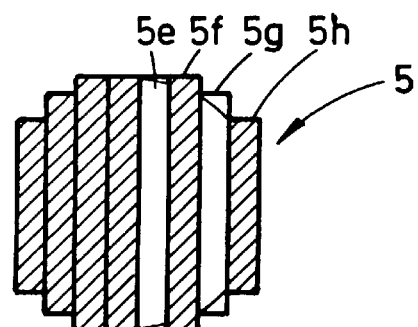

Referring to FIG. 2, shutter 5 may be composed of vertical strips 5a to 5h of liquid crystal material which can be individually controlled by signals from circuitry 8. In FIG. 2a, the left-hand image is formed and elements 5a and 5b are opened. At the instant the shutter switching signal is generated, these shutter elements are closed and shutter elements 5e and 5g are opened as shown in FIG. 2b, allowing the right-hand image to be formed. The above sequence is repeated at a rapid rate e.g. 24 image pairs per second.

By controlling the number of shutter elements open at each exposure, the illumination and/or depth of field can be controlled and the conventional iris can be dispensed with. For example it only shutter element 5c were opened to form the left-hand image and only shutter element 5f were opened to form the right-hand image the f-number of the aperture would be increased relative to that shown in FIG. 2 and hence the illumination would be reduced and the depth of field increased. The stereoscopic separation between the left-hand and right-hand images can also be varied by adjusting the separation between the shutter element(s) opened to form the left-hand image and the shutter element (s) opened to form the right-hand image. For example the separation could be increased by opening elements 5a and 5b to form the left-hand image and elements 5g and 5h to form the right-hand image. In this manner the exposure and stereoscopic separation can be varied independently. It is also possible to divide the shutter elements in the vertical direction and thereby enable further control of the aperture size and location to be obtained.

Figure 3A:
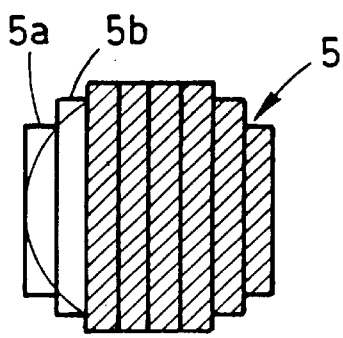
FIG. 3 is an illustration of a further mode of operation of the shutter of FIG. 2.
Figure 3B:
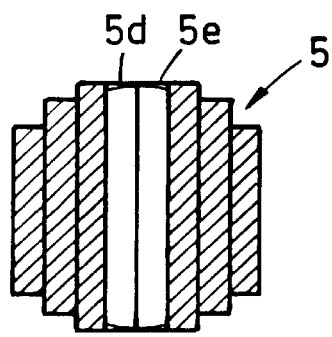
Figure 3C:
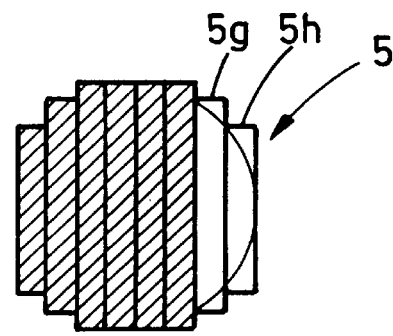

FIG. 3 shows a further mode of operation of the above shutter 5. The video circuitry generates a three-state switching signal which successively causes shutter elements 5a and 5b to open to form the left-hand image (FIG. 3a), shutter elements 5d and 5e to open to form a central image, and shutter elements 5g and 5h to form a right-hand image. A corresponding three-state switching signal is sent to the viewing spectacles (FIG. 1) to cause the left eyepiece, then both eyepieces, then the right eyepiece to open in sequence. This mode of operation slightly compromises the stereoscopic effect but increases the average illumination and reduces flicker. In the cine film variant of the invention the mode of operation shown in FIG. 3 may be varied by blanking out the entire shutter 5 at stage b), during which time the film is advanced.

Figure 4A:
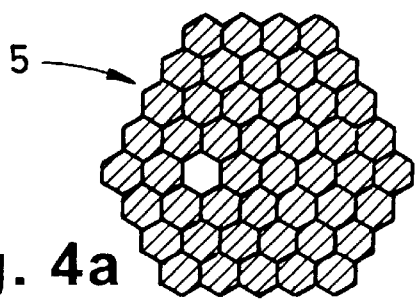
FIG. 4 is an illustration of a further shutter which can be used in an imaging arrangement in accordance with the invention.
Figure 4B:
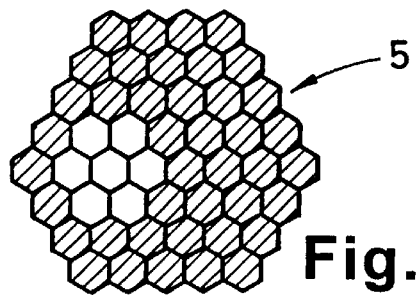
Figure 5A:
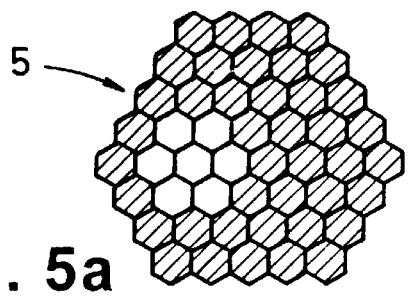
FIG. 5 is an illustration of a further mode of operation of the shutter of FIG. 4.
Figure 5B:
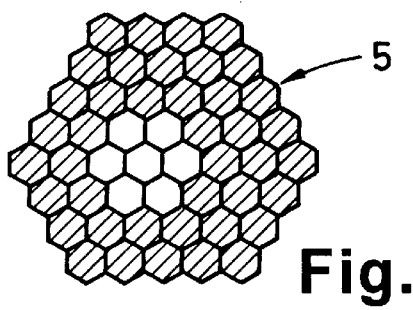
Figure 5C:
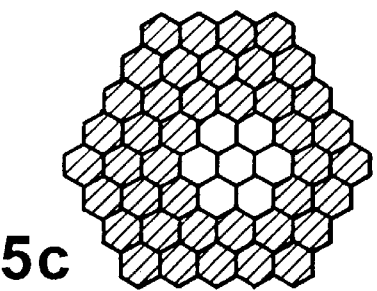
Figure 5D:
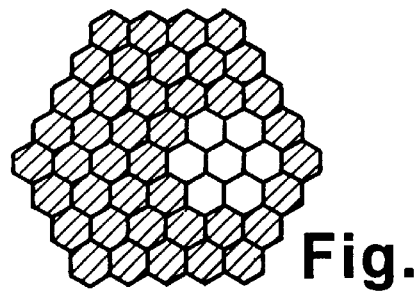

FIG. 4 shows a variant of shutter 5 in which it is composed of hexagonal, individually controllable shutter elements. As shown in FIGS. 4a and 4b, the aperture can be maintained hexagonal (i.e. nearly circular, which is desirable in an optical system) whilst increasing its size. In each case the aperture for forming the left-hand image is shown; the aperture for forming the right-hand image would be the mirror image of that illustrated.

Finally FIG. 5 shows a mode of operation for use in conjunction with the position and/or orientation sensing means 20 (FIG. 1). When the user is on the left of monitor 9 and/or looking at the right-hand portion of the screen, the circuitry 8 generates a first switching signal which causes the two apertures shown in FIGS. 5a and 5b to form sequentially to generate the left-hand and right-hand images respectively. Consequently the user has an apparent vantage point at the left of the field of view of the objective of the endoscope. When the user is on the right of monitor 9 and/or looking at the left-hand portion of the screen, the circuitry 8 generates a second switching signal which causes the two apertures shown in FIGS. 5c and 5d to form sequentially to generate the left-hand and right-hand images respectively. Consequently the user has an apparent vantage point at the right of the field of view of the objective of the endoscope. Hence the user can vary his apparent vantage point simply by changing his position and/or orientation.

Figure 6:
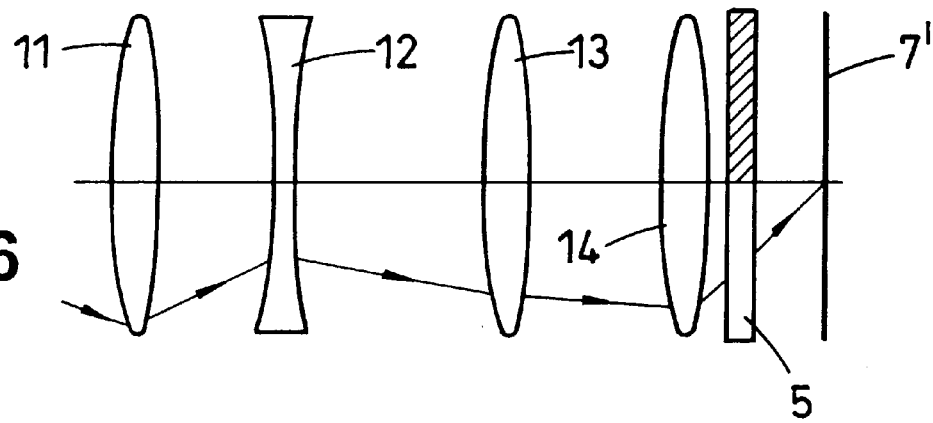
FIG. 6 is an illustration of a zoom lens which can be substituted for the lens arrangement of FIG. 1 and can utilise the shutter of FIGS. 4 and 5.

FIG. 6 shows a zoom lens which can be substituted in the video camera 4 of FIG. 1 or indeed in any other video camera which is used to generate a stereoscopic representation. It comprises a converging lens 11 linked by a standard mechanical linkage (not shown) to a further converging lens 13 to enable the focal length to be adjusted. An intermediate diverging lens 12 is provided and the shutter 5 which may be as shown and described above with reference to any of FIG. 4, for example is mounted behind a further converging lens 14, where the iris would normally be located. The image may be focused on a photosensitive image plane 7', e.g. of cine film.

Figure 7:
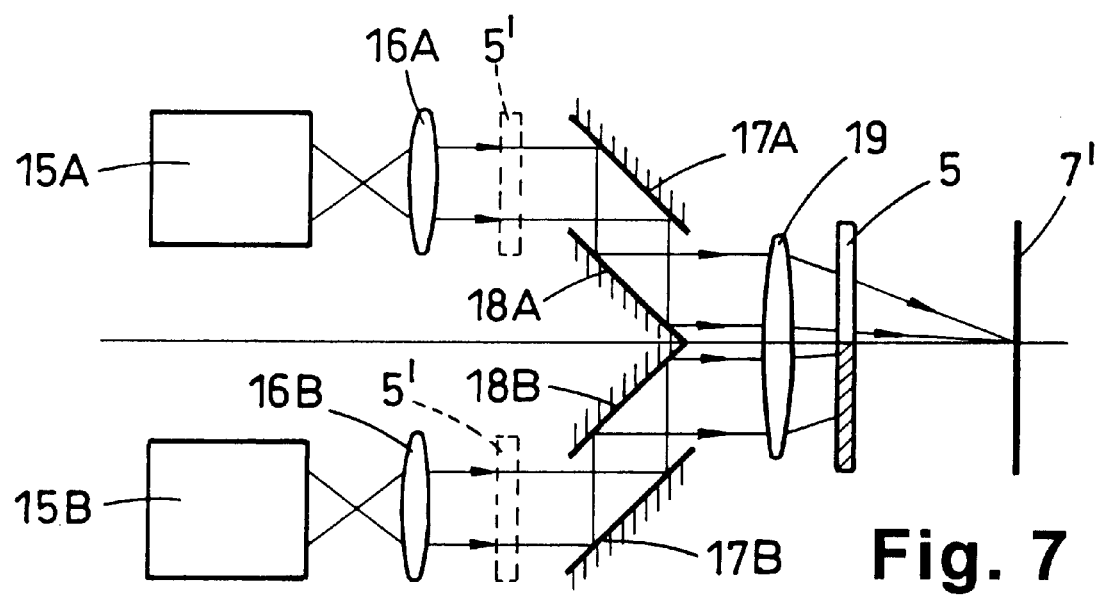
FIG. 7 is an illustration of a binocular stereoscopic imaging arrangement in accordance with the invention.

FIG. 7 shows in plan view a binocular imaging arrangement in accordance with the invention. An optical system 15A (which may for example be a detachable multi-element lens) terminating in relay lens 16A is aligned with parallel reflecting surfaces 17A and 18A. Similarly an optical system 15B (which may for example be a detachable multi-element lens) terminating in relay lens 16B is aligned with parallel reflecting surfaces 17B and 18B. The above binocular system is aligned with a focusing lens 19 and a shutter 5 as described above e.g. with reference to FIG. 4 is located adjacent this in front of a photosensitive image plane 7'. Alternatively shutter 5 may be located behind lens 19 or, as indicated at 5', in front of lenses 16A and 16B.

Although a liquid crystal shutter 5 has been described it will be apparent that mechanical shutters can also be used in the apparatus of the present invention.

The invention is also applicable to night vision systems using image intensifiers (in which case the left and right-hand images are focused onto the photosensitive surface of the image intensifier tube) and to I.R. imaging systems.

Figure 8:
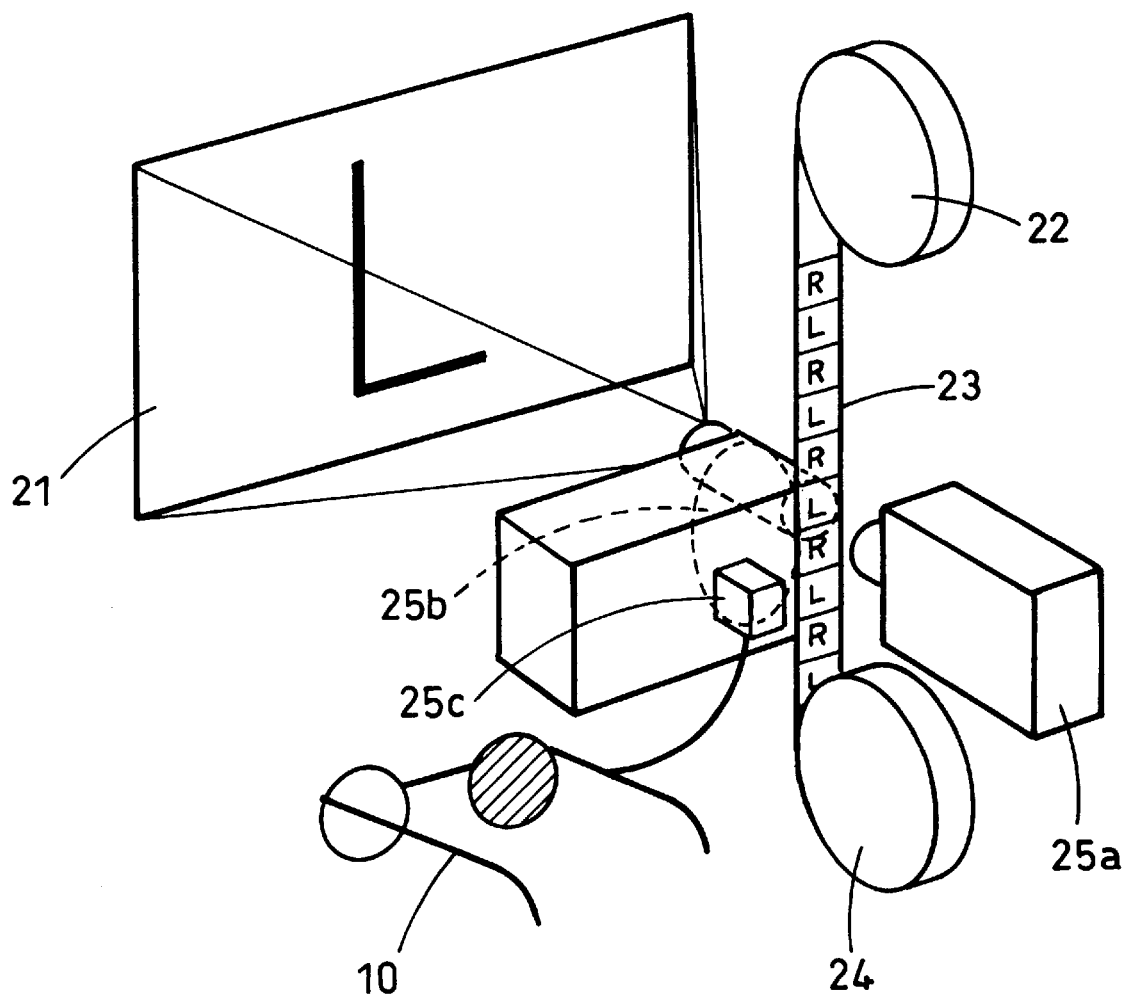
FIG. 8 shows a projector arrangement for stereoscopic display or a cine film recorded with a cine camera variant or the arrangement of FIG. 1.

The display arrangement shown in FIG. 8 comprises a screen 21 on which is displayed alternating left-hand and right-hand images previously recorded on cine film 23 by e.g. the cine film variant of the imaging system of FIG. 1. The film is fed between spools 22 and 24 in front of a projector beam generator 25a at twice the conventional frame rate of 24 frames/sec so that the screen 21 displays the left-hand images L and the right-hand images R in sufficiently rapid succession to avoid excessive flicker. These images are displayed alternately, each at 24 frames/sec under the control of a rotary shutter 25b. A detector 25c (which may be a Hall effect switch responsive to one or more magnets on the shutter) detects the rotary position of the shutter and generates a two-state switching signal which alternately opens the left-hand eyepiece of viewing spectacles 10, according to whether a left-hand image (as shown in the Figure) or a right-hand image is being displayed. Accordingly a viewer wearing the spectacles sees a stereoscopic display.

I claim:

1. A stereoscopic image arrangement comprising (a) an optical device having an objective and further lens means located remotely from, but in the optical path, of the objective and (b) a stereoscopic imaging device arranged to receive light from said further lens means and form an image on a photosensitive image plane, the stereoscopic imaging device having shutter means arranged to selectively occlude light exiting from left and right regions of said further lens means to form right and left images on said image plane and having means for combining said right and left images to form a stereoscopic representation of the field of view of said objective, wherein said shutter means comprises an array of more than two optical shutter elements distributed from left to right and control means for controlling the light transmission of said optical shutter elements so as to vary the stereo base width between said right and left images and to vary the size of the unoccluded left and right regions of said further lens means to vary at least one of the depth of field and the illumination at said image plane.

2. A stereoscopic imaging arrangement according to claim 1 wherein said left and right regions overlap.

3. A stereoscopic imaging arrangement according to claim 1 wherein said shutter means (5) comprises a multiplicity of shutter elements (5a . . . 5h) arranged to form vertical slits of controllable width and/or height and separation.

4. A stereoscopic imaging arrangement according to claim 1 wherein said shutter means (5) includes control means (8) arranged to shift both said left and right regions leftward or rightwards in response to an input signal, whereby said field of view is shifted.

5. A stereoscopic imaging arrangement according to claim 1, wherein said stereoscopic imaging device includes a simple multi-element lens and said shutter means constitutes the iris of said simple multi-element lens which is arranged to receive, in use, parallel rays of light from said further lens means and to direct the rays onto the shutter means.

6. A stereoscopic imaging arrangement according to claim 1 wherein said stereoscopic imaging device is a video camera (4) arranged to generate alternate signals representative of said right and left images in response to switching of the shutter means (5) and includes video processing means responsive to said signals for generating an output signal representative of the stereoscopic field of view of said objective (2).

7. A stereoscopic imaging arrangement according to claim 1 wherein said optical device (1) is a monocular optical device.

8. A stereoscopic imaging arrangement according to claim 1 wherein said optical device (1) is an endoscope.

9. A stereoscopic imaging arrangement according to claim 1 wherein said shutter means (5) is a liquid crystal device.

10. A stereoscopic imaging arrangement according to claim 1 wherein said stereoscopic imaging device is separable from and usable independently of said optical device (1).

11. A stereoscopic viewing arrangement comprising a stereoscopic imaging arrangement as claimed in claim 1 and a display means (9,10,20) arranged to display a stereoscopic representation of said field of view.

12. A stereoscopic viewing arrangement according to claim 11 wherein said display means comprises a screen (9) arranged to display said left and right images alternately in rapid succession and binocular viewing means (10) arranged to convey said alternately displayed left and right images selectively to the left eye and right eye of a user.

13. A stereoscopic viewing arrangement according to claim 12 wherein said stereoscopic imaging arrangement is as claimed in claim 7 and said display means (9,10,20) includes means (20) for detecting the orientation and/or position of said binocular viewing means relative to said screen (9) and means for generating said input signal in response to said detected position and/or orientation.

\* \* \* \* \*